United States Patent
Forster et al.

(10) Patent No.: US 8,903,706 B2
(45) Date of Patent: Dec. 2, 2014

(54) SYSTEM FOR EMBEDDED MICROCONTROLLER AND METHOD

(75) Inventors: Frank Forster, Ismaning (DE); Markus Pfeiffer, Munich (DE)

(73) Assignee: Texas Instruments Incorporated, Dallas, TX (US)

(*) Notice: Subject to any disclaimer, the term of this patent is extended or adjusted under 35 U.S.C. 154(b) by 42 days.

(21) Appl. No.: 12/874,743

(22) Filed: Sep. 2, 2010

(65) Prior Publication Data
US 2013/0167125 A1 Jun. 27, 2013

(30) Foreign Application Priority Data
Sep. 2, 2009 (DE) .................. 10 2009 039 738

(51) Int. Cl.
*G06F 9/455* (2006.01)
*G06F 11/36* (2006.01)

(52) U.S. Cl.
CPC ........ *G06F 11/3664* (2013.01); *G06F 11/3652* (2013.01)
USPC .............................................. 703/28; 703/23

(58) Field of Classification Search
CPC ............ G06F 11/3664; G06F 11/3652; G06F 11/3648
USPC .................................................. 703/23, 28, 27
See application file for complete search history.

(56) References Cited

U.S. PATENT DOCUMENTS

| | | | |
|---|---|---|---|
| 5,873,045 A * | 2/1999 | Lee et al. ................... | 455/556.2 |
| 8,117,587 B1 * | 2/2012 | Testardi ........................ | 717/100 |
| 8,259,075 B2 * | 9/2012 | Gioscia et al. ................ | 345/169 |
| 2003/0074180 A1 * | 4/2003 | Shibayama et al. ........... | 703/28 |
| 2006/0163360 A1 * | 7/2006 | Steusloff et al. ......... | 235/472.02 |
| 2007/0168731 A1 * | 7/2007 | Lambrache et al. ............ | 714/30 |
| 2008/0109260 A1 * | 5/2008 | Roof ................................ | 705/3 |

* cited by examiner

*Primary Examiner* — Eun Kim
(74) *Attorney, Agent, or Firm* — Robert D. Marshall, Jr.; Frederick J. Telecky, Jr.

(57) ABSTRACT

The invention is system for emulating a target application comprises a computer, and a capsular including a microcontroller, a programmable non-volatile memory, a numeric display, a transceiver for transmitting and receiving data, a real time clock and at least one input device interacting with a program run on the microcontroller. The capsular is couplable to the computer and adapted to fit in a housing. The input device is operable both when the capsular is inside the housing and when the capsular is outside the housing.

4 Claims, 3 Drawing Sheets

SYSTEM FOR EMBEDDED MICROCONTROLLER AND METHOD

CLAIM OF PRIORITY

This application claims priority under 35 U.S.C. 119(a) to German Patent Application No. 10 2009 039 738.8 filed Sep. 2, 2009.

TECHNICAL FIELD OF THE INVENTION

The technical field of this invention is a system for an embedded microcontroller and a method.

BACKGROUND OF THE INVENTION

Software development tools for embedded microcontroller systems usually include a board on which a microcontroller, a memory and various interfaces, buttons and light emitting diodes are arranged. A software tool running on a computer can write and debug a software program for microcontrollers of the kind on the board. A microcontroller of the same type may then run the finalized software program to be used in a target application. Although flexible programming and interaction with various sensors and actuators is usually possible, the environment in the development tool can never be identical to the target application. Accessibility of buttons and interfaces entails insufficient EMI compliance with target applications and influences of environmental peculiarities of the target application.

SUMMARY OF THE INVENTION

This invention is a system for software development allowing software development in the target environment with respect to operability, EMI and other influences of the target application.

One aspect of the invention provides a system emulating a target application. The system includes a capsular. The capsular comprises a microcontroller suitable for the target application, a programmable memory, an numeric display, a transceiver for transmitting and receiving data, a real time clock and at least one input device, as for example a button, interacting with a program run on the microcontroller. The system may also comprise an interface board coupled to the capsular and to a computer. The capsular is coupled to a computer and inserted in a housing. The housing carries the capsular to and within the environment of the target application. The capsular may be removed from the housing for programming and debugging the program. The input device is operable when the capsular is inside the housing and when it is outside the housing. In this aspect of the invention, the software development tool is partitioned into at least three parts: a capsular to be used as the target; a housing for the capsular; and a computer. The capsular can be decoupled from the interface board and carried through any area or to any location having the realistic conditions of the target application. Thus the software can be used and tested under the conditions of the target application. These components are arranged in a small, self-contained housing providing the hardware for developing the software program can be used and tested in the environment of the target application. The capsular can be used to perform tests in harsh and extreme conditions. The capsular and the housing provide access to the input device when the capsular is in the housing and outside the housing. This provides the functionality to interact with the program within the target application and when the capsular is connected to the computer. The input device is advantageously provided on an outer circumference of the capsular.

Another aspect of the invention, a top plate of the capsular is advantageously configured to serve as an antenna. The top plate can substantially cover one side of the capsular. This can advantageously be the side where the display is located. There are many different existing devices using wireless data communication. For these known devices, the antennas are usually optimized in size and shape for a specific application. In this aspect of the invention, the top plate of the capsular is used as an antenna. Thus the housing of the capsular incorporates two functions shock protection and antenna. This surprisingly substantially improves the electromagnetic interference (EMI) compliance of the capsular. The top plate forms part of the capsular serves as a shielding against disturbances and noise and has an optimum position to be used as the antenna. Surprisingly, it is more efficient to use a compensation network for the top plate of the housing to adapt it to a specific transmission frequency range instead of using a customized antenna, such as a chip-antenna with an integrated coil. Suitable frequency ranges are 2.4 GHz, 868 MHz, 915 MHz, 433 MHz etc.

According to another aspect of the invention, the system comprises an interface board coupling the capsular to a computer for developing, debugging and downloading the software to the target. The interface board implements the necessary signals and signal conversions for communication between the capsular and the computer similar to the JTAG standards.

In another advantageous aspect of the invention, the housing has a maximum diameter that is smaller than 5 cm. The quality of the wireless data transmission, the manageability and the EMI are made optimum for a specific size of the capsular. The maximum diameter may advantageously be smaller than 5 cm and larger than 1 cm.

In another aspect of the invention, the top plate of the capsular that is used as an antenna has a substantially square or rectangular outer circumference. The outer length and width of the top plate do not differ from each other by more than 30%. The diameter of the top plate of the housing is between 1 cm and 5 cm. In an advantageous embodiment, the diameter is about 5 cm. The top plate substantially covers one side of the capsular. This means that the top plate or at least its circumference is adapted to the shape of the capsular.

According to another aspect of the invention, the top plate of the capsular has an opening or cutout. The opening or cutout is used for a display that is visible from a top view of the capsular. Surprisingly, the cutout or opening in the top plate does not adversely affect the function of the top plate as antenna and shield. The cutout makes it possible to implement and show the display on the top side of the capsular. The housing has a transparent window for the display. This enables important parameters and data to be displayed in the target application.

The capsular has the form factor of a wrist watch (without wristband). The capsular provides improved electrostatic discharge and electromagnetic interference compatibility. Furthermore, a wrist watch form factor (or a similar size and shape) allows the capsular to be carried over long distances. This simplifies software development for decentralized target applications. The size and shape of a wrist watch advantageously complies with the size requirements (1 cm to 5 cm) for optimized EMI and optimized performance of the top plate of the capsular.

In another embodiment, the capsular has a connector for connecting the capsular to a computer. This can be used for programming the embedded microcontroller and for debugging the program with a software tool running on the computer.

The capsular is configured to program the embedded microcontroller through a wireless connection. The wireless connection uses a transceiver in the capsular. Thus the capsular can remain in the housing during debugging and/or programming steps. This is advantageous for target applications with rough environmental conditions.

According to another aspect of the invention, the capsular includes an acceleration sensor. The acceleration sensor is advantageously used in combination with the real time clock for measuring movements, acceleration and/or speed. The acceleration sensor is preferably a three axis accelerometer.

According to another aspect of the invention, the capsular includes a pressure sensor. This pressure sensor measures altitude or relative height.

Another aspect of the invention includes a temperature sensor in the capsular. Including a temperature sensor, a 3-axis accelerometer and a pressure sensor covers the minimum required sensors for many target applications.

Still other embodiments exchange data with body sensors attached to body of a human being or an animal. The measured sensor signals are bio-signals transmitted to the capsular.

According to another aspect of the invention, the housing includes an electronic component functionally coupled with the capsular when the capsular is in the housing. For example, a buzzer may be attached to the housing. The may automatically contacts the capsular when the capsular is inserted into the housing. The capsular provide signals driving the buzzer. The capsular may contain a battery or an accumulator for supplying the capsular. Such a capsular includes holder for the battery or the accumulator on the opposite side with respect to the display.

The invention also includes a method of developing a software program for a target application. The program is run on a microcontroller carried within the target environment. A top plate substantially covering one side of the capsular is used as an antenna. The top plate has a cutout for a display. An input device on the capsular interacts with the program. The capsular is coupled to a computer for debugging the program or reprogramming the microcontroller. An interface similar to the JTAG standard couples the capsular to the computer. A wireless connection between capsular and computer exchanges data, debugs the program and/or reprograms the microcontroller. The capsular is carried in a housing. The housing has a transparent opening for a display.

Further aspects of the method correspond to the characteristics of the previously described system.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
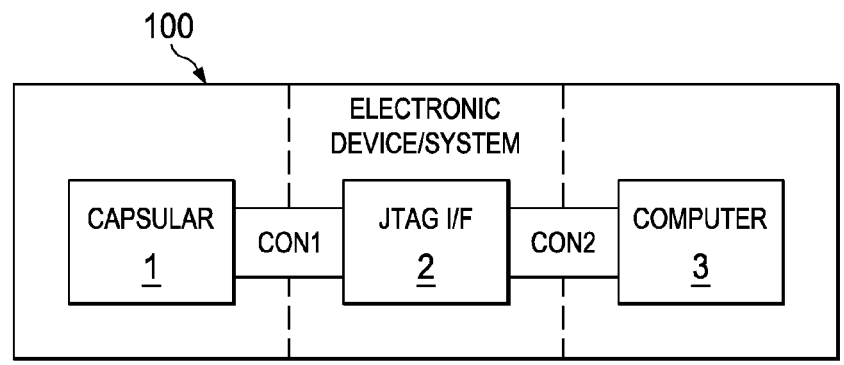
FIG. 1 is a simplified block diagram of a system according to an embodiment of the invention.

FIG. 1 is a simplified block diagram of a system according to an embodiment of the invention. The electronic software development system 100 includes three parts: capsular 1; JTAG interface 2; and computer 3. Capsular 1 is coupled to JTAG interface 2 through first connector CON1. JTAG interface 2 is coupled to the computer 2 through second connector CON2. Capsular 1 may be decoupled from JTAG interface 2 and computer and carried to any location determined by the capsular application. A housing (not shown) contains capsular 1.

Figure 2:
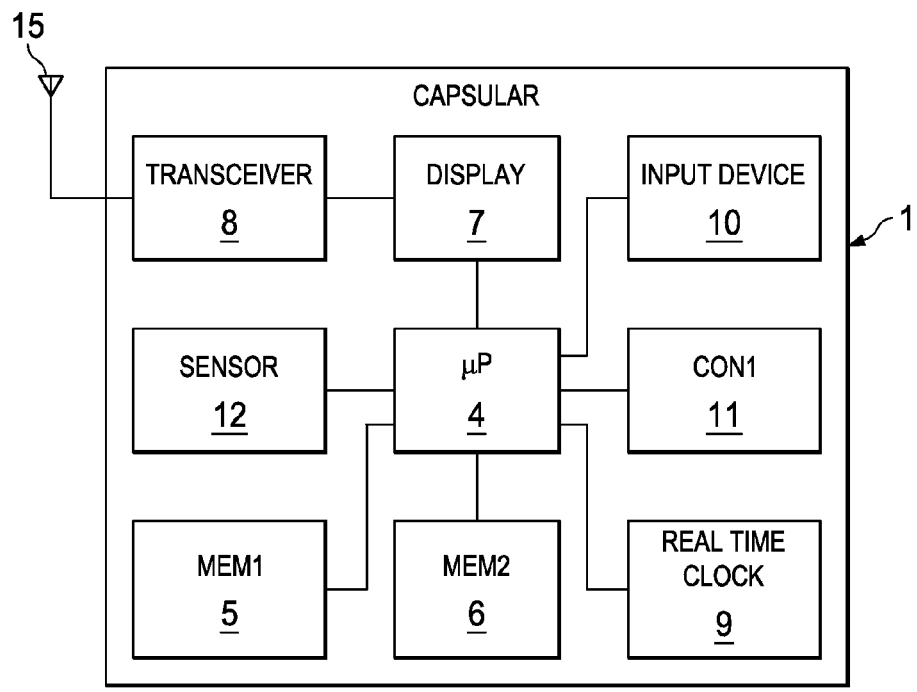
FIG. 2 is a simplified block diagram of a capsular in accordance with an embodiment of the invention.

FIG. 2 is a simplified block diagram of an embodiment of capsular 1 shown in FIG. 1 configured according to aspects of the invention. In this embodiment, capsular 1 includes: microprocessor 4; first memory MEM1 5; and second memory MEM2 6. In another embodiment, only one memory may be used. First memory MEM1 5 may be a volatile memory such as dynamic random access memory (DRAM). Second memory MEM2 6 may be a non-volatile memory such as electrically erasable programmable read only memory (EEPROM), Flash memory or read only memory (ROM). Microprocessor 4 drives display 7. Capsular 1 further includes transceiver 8 for wirelessly transmitting and receiving data through antenna 15. Input stage 10 is coupled to microprocessor 4 in order to interact with a program run on microprocessor 4. One or more sensors 12 sense various different signals, for example speed, acceleration, altitude, pressure and temperature. The sensor signals may be pre-processed, amplified and converted (forexample analog-to-digital conversion) in sensor 12 then transferred to microprocessor 4 for further processing. Capsular 1 also includes connecter CON1 11 connecting capsular 1 to JTAG interface 2 as shown in FIG. 1. Capsular 1 further includes real time clock 9, which provides time and/or date information to microprocessor 4. Time and date information can be displayed via display 7.

Figure 3:
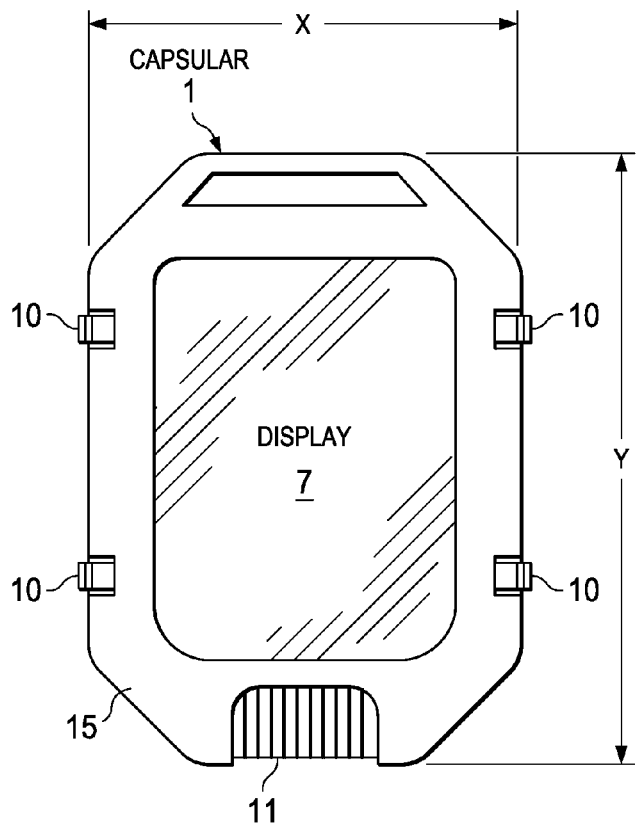
FIG. 3 is a top view of a capsular according to an embodiment of the invention.

FIG. 3 is an embodiment of capsular 1 according to aspects of the invention. Capsular 1 is substantially block-shaped. FIG. 3 is a top view of capsular 1 including the components shown in FIG. 2. The dimensions X and Y of capsular 1 are such that the maximum diameter of capsular 1 is less than 5 cm. X and Y should not deviate from each other by more than 30%. The hatched area is a top plate of capsular 1 that serves as antenna 15. The top plate has a cutout through which display 7 can be seen. A compensation network in capsular 1 adapts the top plate to the required transmission frequency range. The top plate is also a shield and generally improves resistance to electromagnetic interference. The top plate serves as antenna, shock protection, housing and shield. This improves the electromagnetic interference (EMI) and electrostatic discharge (ESD) characteristics of capsular 1. The front side of capsular 1 is substantially occupied by antenna 15 and display 7. Display 7 shows information such as time, date, speed, acceleration, temperature, altitude, pressure etc. Connector 11 is configured to couple to a corresponding connector of JTAG interface 2 for coupling capsular 1 to computer 3 for downloading, testing and debugging software on capsular 1. Input devices 10 are arranged on the left and right hand side of capsular 1. Input devices 10 may be push buttons interacting with microprocessor 4 or rather a program executed on the microprocessor (not shown in FIG. 3).

Figure 4:
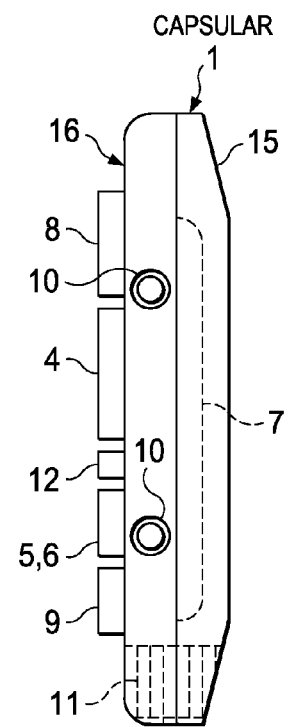
FIG. 4 is a side view of the embodiment of FIG. 3.

FIG. 4 is a side view of capsular 1 illustrated in FIG. 3. Components are arranged on two opposite sides of board 16. The front side carries display 7. Microprocessor 4, sensors 12, memories 5 and 6, real time clock 9 and transceiver 8 are mounted underneath display 7 or on the back side of board 16. Connector 11 to JTAG interface 2 is on the bottom. Input devices 10 (buttons) are mounted on the outer circumference of capsular 1. Thus input devices 10 are accessible even when capsular 1 is in the housing. The housing has openings, elements or devices configured to actuate input devices 10 of capsular 1.

Figure 5:
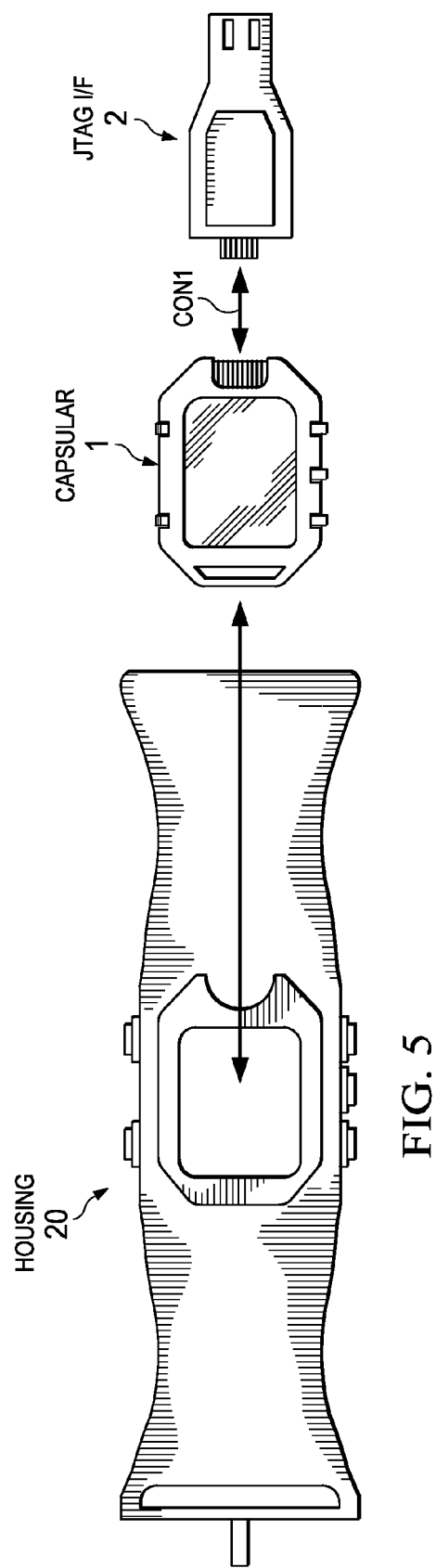
FIG. 5 is another embodiment of the invention where the capsular and the housing are configured as a wrist watch.

FIG. 5 illustrates an embodiment where capsular 1 fits into housing 20 of a wrist watch. Capsular 1 is the watch configured as explained with respect to FIGS. 1 to 4. Capsular 1 is inserted into watch housing 20. When capsular 1 is inserted, the device looks like a conventional wrist watch. For emulating programs, downloading software to be executed by microprocessor 4 and for debugging the software, capsular 1 is removed from watch housing 20 and coupled to JTAG interface 2. JTAG interface 2 is coupled to computer 3. Input devices 10 are still accessible when capsular 1 is inside housing 20. Display 7 can be seen through a transparent window on the front side of housing 20. The top plate of the capsular serves as shock protection, shield and antenna for the device.

Although the invention has been described hereinabove with reference to specific embodiments, it is not limited to these embodiments and no doubt further alternatives will occur to the skilled person that lie within the scope of the invention as claimed.

What is claimed is:

1. A system for emulating a target embedded microcontroller system in a target application comprising: comprising:
   a computer;
   a housing; and
   a capsular including
     a microcontroller, of a same type as a microcontroller in the target embedded microcontroller system and operable to run the same software program,
     a programmable non-volatile memory,
     a numeric display,
     a transceiver for transmitting and receiving data,
     a real time clock, and
     at least one input device interacting with a program run on said microcontroller,
   wherein said capsular is adapted to couple to said computer and adapted to fit in said housing;
   wherein said capsular is operable to be placed in a target environment of the target embedded microcontroller system; and
   said input device is operable when said capsular is inside said housing and when said capsular is outside said housing.

2. The system according to claim 1, further comprising:
   said capsular further includes a top plate configured to serve as an antenna.

3. The system according to claim 2, wherein:
   said top plate has a cutout for said display.

4. The system according to claim 1, wherein:
   said capsular has a maximum diameter of less than 5 cm.

* * * * *